B. F. ELLIOTT.
Grape-Vine Trellis.
No. 56,541.
Patented July 24, 1866.
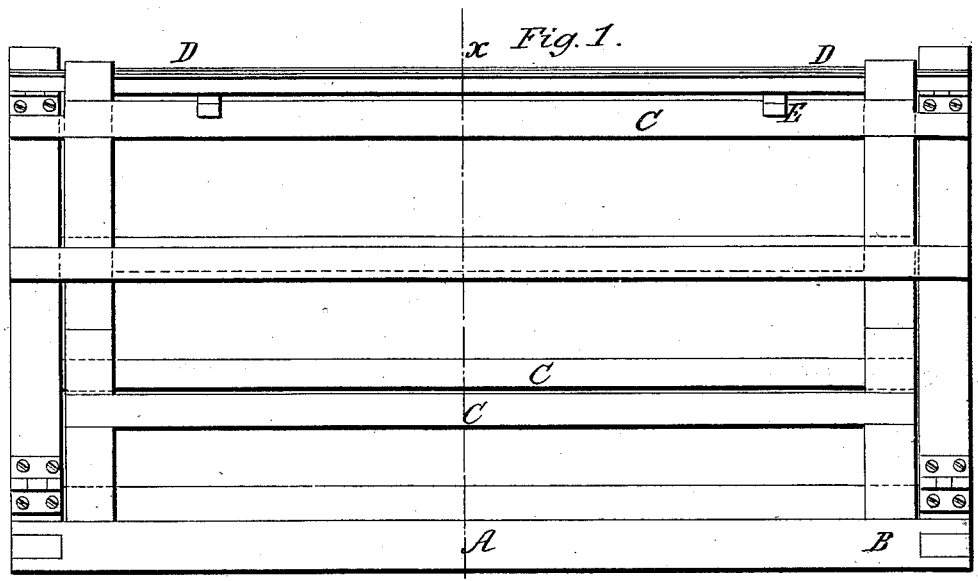
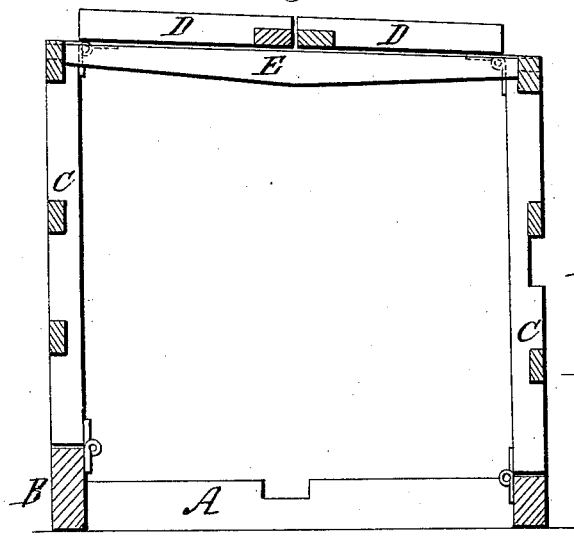
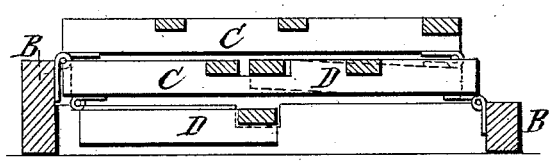
Witnesses.
Jas. A. Service.
J. W. Barrington.
Inventor.
B. F. Elliott
Per Munn & Co.
Attys.

UNITED STATES PATENT OFFICE.

B. F. ELLIOTT, OF CEDAR RAPIDS, IOWA.

IMPROVEMENT IN GRAPE-TRELLISES.

Specification forming part of Letters Patent No. 56,541, dated July 24, 1866.

*To all whom it may concern:*

Be it known that I, B. F. ELLIOTT, of Cedar Rapids, county of Linn, and State of Iowa, have invented a new and useful Improvement in Trellises or Racks for Grape and other Vines; and I do hereby declare that the following is a full, clear, and exact description thereof, which will enable others skilled in the art to make and use the same, reference being had to the accompanying drawings, forming part of this specification.

The object of the present invention is to so construct or arrange a trellis or rack for grape and other vines that in autumn or the fall it can be lowered to the ground, and in the spring raised therefrom to an upright position, thereby obviating the necessity of removing or detaching the grape or other vine from the trellis, the advantages of which are obvious.

In accompanying plate of drawings my improvement in a trellis for grape and other vines is illustrated, Figure 1 being an elevation of one side of the trellis; Fig. 2, a transverse vertical section taken in the plane of the line $x\,x$, Fig. 1; and Fig. 3, a transverse section, showing the trellis when laid or folded down upon the ground.

Similar letters of reference indicate like parts.

A in the drawings represents the lower or sill frame of the trellis, which rests upon the ground and is made of a rectangular shape, having hinged to each of its side strips, B, and extending the entire length of the same, a similar frame or trellis, c, to the upper edges of each of which another similar frame or trellis, D, is hung, that, when the trellis or frames c are in an upright or vertical position, meet in a line half way, or nearly so, between them, as is plainly shown in Fig. 2, and are there held in a horizontal position by cross-bars E, passed under the same and inserted at each end in suitable notches of the side frames, c.

By removing the cross-bars E the upper or top frames, D, can be swung down and upon the inside of the upright or side frames, c, when, swinging such frames, first the one and then the other down and upon the ground, the whole frame or trellis can be laid in and brought to a compact form thereon, as plainly shown in Fig. 3 of the drawings, thereby enabling the vine for which such trellis is used to be brought into the proper position for being preserved during the winter or cold months from the frost, and when spring or the warm season opens raised into an upright position, without the necessity of removing the said vine from the trellis, the importance of which is self-evident.

I claim as new and desire to secure by Letters Patent—

The side frames, c, and upper frames, D, in combination with the cross-bars E, or any other suitable fastening device for holding the said upper frames, D, in a horizontal position, or nearly so, when attached or connected together and to any suitable bed-frame or supports on the ground, substantially as and for the purpose described.

B. F. ELLIOTT.

Witnesses:
B. F. HOWLAND,
H. ROBINSON.